United States Patent [19]

Eisemann

[11] 4,087,096
[45] May 2, 1978

[54] PICK-UP ARM POSITIONING MECHANISM FOR AN AUTOMATIC RECORD PLAYER

[75] Inventor: Kurt Eisemann, Berlin, Germany

[73] Assignee: U.S. Philips Corporation, New York, N.Y.

[21] Appl. No.: 685,067

[22] Filed: May 10, 1976

[30] Foreign Application Priority Data

May 16, 1975 Germany ............................ 2521870

[51] Int. Cl.² ........................................... G11B 17/08
[52] U.S. Cl. ................................. 274/10 R; 274/15 R
[58] Field of Search .................. 274/10 R, 15 R, 23 R

[56] References Cited

U.S. PATENT DOCUMENTS

| | | | |
|---|---|---|---|
| 2,488,137 | 11/1949 | Morrison | 274/10 R |
| 2,681,227 | 6/1954 | Fisher | 274/10 R |
| 3,010,724 | 11/1961 | Hansen | 274/10 R |
| 3,304,092 | 2/1967 | Faulkner | 274/23 R |
| 3,433,486 | 3/1969 | Kawaharazaki | 274/15 R |

Primary Examiner—Richard E. Aegerter
Assistant Examiner—John W. Shepperd
Attorney, Agent, or Firm—Frank R. Trifari; David R. Treacy

[57] ABSTRACT

A pick-up arm guiding mechanism for an automatic record player having a command disc with pin-guiding concentric grooves for a sensor pin which is connected to the pick-up arm, each groove corresponding to a specific record size, the pin being directed into the desired groove by a mechanical catching means. During the rotation of the command disc in a changing cycle the pin engages a diversion groove which directs the pin toward the disc center, and the pin is forced out of the groove when the inward movement is blocked by a stop disposed such that the pin engages with the selected pin-guiding groove.

3 Claims, 11 Drawing Figures

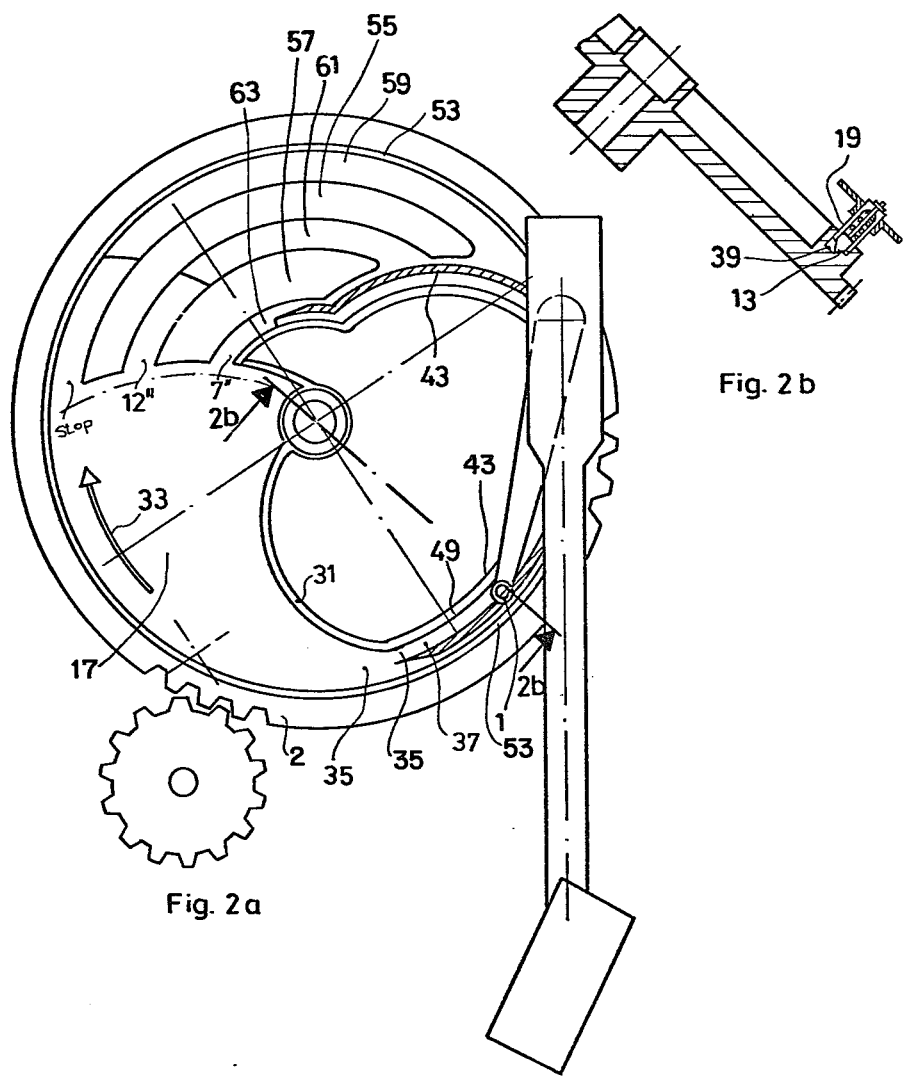

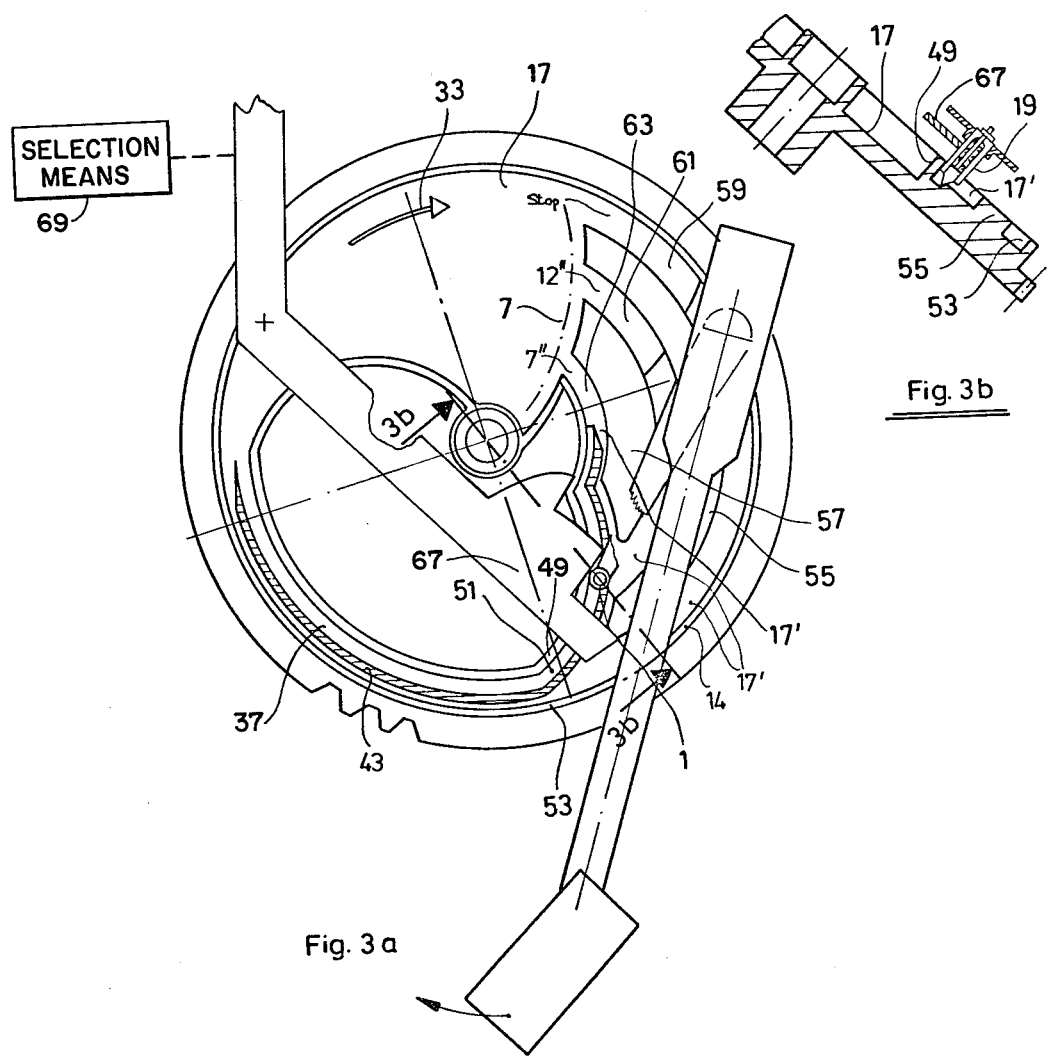

PICK-UP ARM POSITIONING MECHANISM FOR AN AUTOMATIC RECORD PLAYER

BACKGROUND OF THE INVENTION

The invention relates to a mechanism for an automatic record player, in which the pick-up arm movements during the changing cycle are controlled by a command disc in which grooves are formed for a sensor pin connected to the pick-up arm, one of a plurality of substantially concentric grooves being the pin-guiding groove for a specific phonograph record size, and the pin being directed into the desired groove by a mechanical catching means.

DESCRIPTION OF THE PRIOR ART

Such a device for an automatic record player is known from the PHILIPS record player type GC 043. To allow pivotal movements across a record to be played, the pin is movable freely over the bottom of a radially extending region of the command disc, which is then stationary. When a new changing cycle is initiated, such as when a new record from a stack of records is positioned on the turntable, the command disc is started. Subsequently, the pin is pushed outwards by a command-disc wall which extends outwards, and the pick-up arm pivots outwards. As the command disc rotates further the pin subsequently moves along the edge of the disc. During this time the command disc performs several control operations, including sensing of the record diameter. After these sensing and control operations of the changer mechanism the pin is pushed inwards in the direction of the command-disc center by means of a resilient control plate that it is in front of the pin-catching slot for the sensed record size. As the command disc rotates further, the pin then engages the corresponding pin lead-in slot, and the pick-up arm is consequently lowered onto the edge of the phonograph record at the required distance from the turntable center for the record size. Such as resilient control plate requires a very expensive control mechanism.

Alternatively, it is also known to lead the pin into the pin lead-in slot for a given record size with the aid of mechanically controlled directing means. However, this also demands expensive control measures. For example, groove switching resilient sensing pins are known, such as from U.S. Pat. No. 2,488,137. Such a resilient sensing pin runs in one of a number of bottom grooves of a command disc. However, switching from one groove to another is performed by a rod which must move in perfect synchronization with the command disc to push the pin inwardly. Bringing the pin in position for engagement with the pin lead-in grooves by an interposed stop for different record diameters has not been considered.

SUMMARY OF THE INVENTION

It is an object of the invention to provide a pick-up arm positioning mechanism for an automatic record player in which the pin runs into the pin guiding groove for the relevant record size by merely blocking inward pin movement.

In accordance with the invention as the command disc rotates during a changing cycle, the pin, which is mounted resiliently perpendicular to the sensing surface, in a manner known per se, engages a bottom groove of a diversion groove, which directs said pin substantially in the direction of the disc center, and when the inward pin movement is mechanically stopped the pin is forced out of the groove and engages the selected pin-guiding groove for the relevant record size or for the stop function. To accomplish this the inward movement is stopped by interposing a stop member which blocks the path of the pin.

This device provides a very reliable, silent and simple guidance for the inward movement of the pick-up arm. The basic difference with respect to the prior art is that the pin automatically passes by the pin-catching slots for the various record sizes and only moves out of the groove and engages the corresponding pin guiding groove as a result of the presence of a means which impedes its path.

In accordance with a further embodiment of the invention the resilient pin is guided in a sleeve, which sleeve engages the walls of the guiding groove. Thus, it becomes possible, to perform the pivotal movements of the pick-up arm both by engaging the pin and engaging the sleeve.

In accordance with a further embodiment of the invention the pin engages the grooves with a tapered point. The contact side of the diversion groove, in its turn, is provided with an oblique flank, the slope of the flank corresponding to the amount of taper. For this purpose, the groove in accordance with a further embodiment of the invention has a trapezoidal cross-section, only one flank being oblique, and a pin is guided in the groove by engagement of the perpendicular inner flank with the sleeve at the one side and the engagement of the tapered point with the oblique outer flank at the other side.

In order to enable the pin to engage the pin lead-in grooves, the groove walls, in accordance with a further embodiment of the invention, are removed between the bottom groove and the entrances of the pin-catching grooves.

Finally, in accordance with a further embodiment of the invention, the pin is only lifted off the bottom at the location of the bottom groove and until after engagement with the relevant pin guiding groove, while during further movement cycles the sleeve guides the pin between the guiding groove walls.

BRIEF DESCRIPTION OF THE DRAWING

The invention will be described in more detail with reference to an embodiment shown in the drawing. In the drawing:

FIGS. 1a, 2a, 3a, 4a, 5a are plan views of a command disc with different positions of the pick-up arm and the command disc in different angular positions of the command disc.

FIGS. 1b, 2b, 3b, 4b, 5b are radial cross-sections of the corresponding FIGS. 1a, 2a, 3a, 4a and 5a.

DESCRIPTION OF THE PREFERRED EMBODIMENT

Figure 1B:
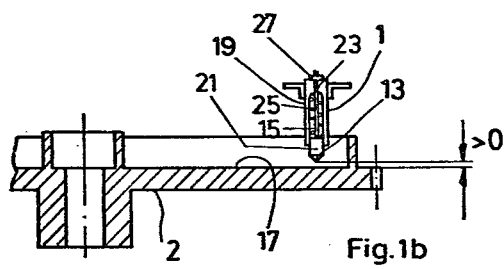
Figure 1A:
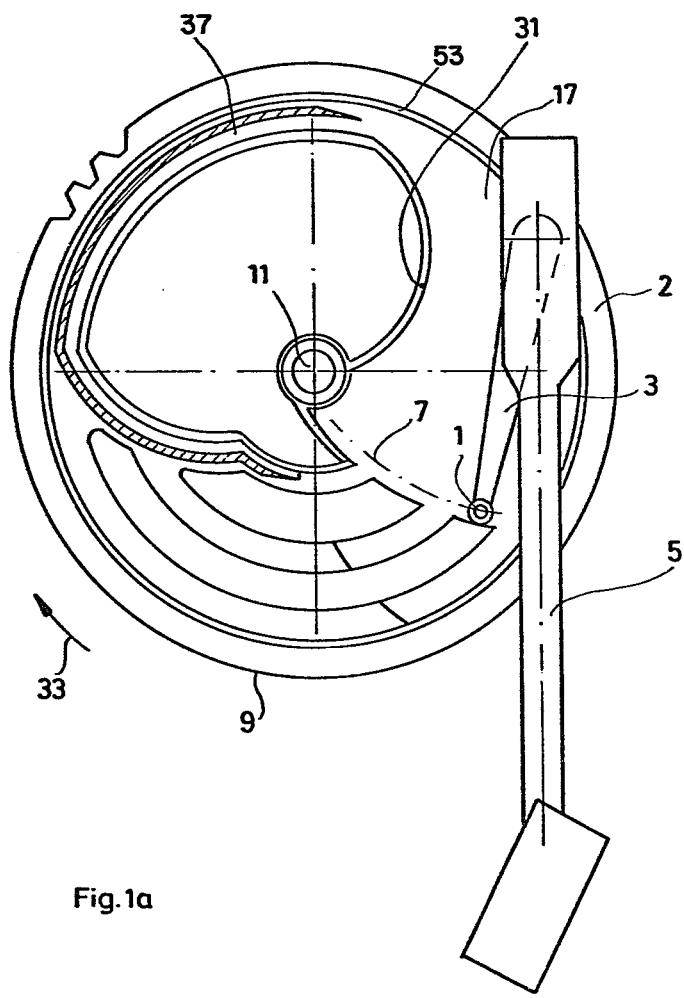

In the plan view of a command disc 2 of an automatic record changer shown in FIG. 1a a guide pin assembly 1 which is rigidly connected to the pick-up arm 5 by a lever 3, moves along a path corresponding to dash-dot line 7 extending generally radially from the periphery 9 of disc to the disc axis 11 when the command disc is stationary. During this arcuate movement the a tapered point 13 at the bottom of the pin assembly 1 is not in contact with a bottom region 17 of the command disc.

Figure 6:
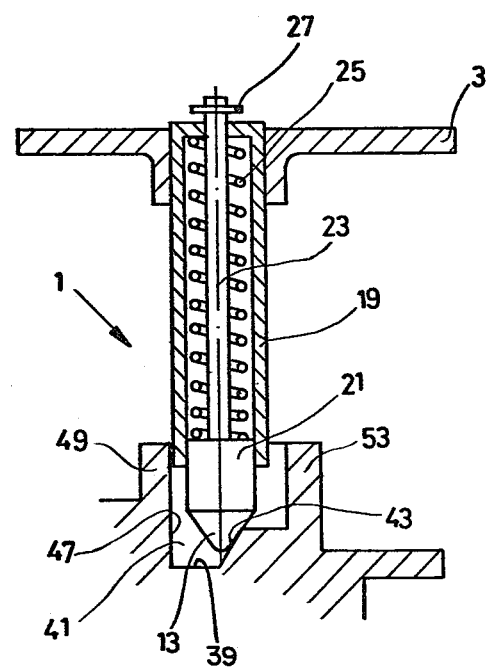
FIG. 6 is a scaled-up view of the spring-loaded pin during engagement with the flank of a bottom groove.

As is shown in FIG. 6, the pin assembly 1 comprises a sleeve 19 fixed perpendicular to the lever 3. A guid rod 23 is movable vertically in the sleeve 19, a head 21 being fixed at the lower end of the rod with the bottom of the head forming the point 13. A pressure spring 25 presses the point 13 downward as far out of the sleeve 19 as is allowed by a retaining clip 27 placed on the upper end of the rod 23 above the sleeve.

As is shown in FIG. 1b the distance between the point 13 of the point 21 and the bottom region 17 is greater than zero during playing.

At the beginning of a changing cycle the command disc 2 is started. This means that the pin 1, which has moved inwards in the meantime, is now moved outwards along a wall 31 which is a boundary of the region 17 (FIG. 2a). The disc revolves in the direction of an arrow 33. Briefly before engagement with a peripheral groove 37 the bottom of the command disc 2 is slightly raised at a region 35 near the entrance of the groove 37. This rise is clearly visible as a bottom surface 39 in FIG. 2b. The shape of the groove 37 and the bottom groove 41 formed in it is even more clearly visible in FIG. 6. The bottom groove 41 has an approximately trapezoidal cross-section, an outer flank 43 being disposed at an oblique angle relative to the horizontal bottom surface 39, while the inner flank 47 extends vertically along a wall 49. The taper of the conical point 13 of the head 21 corresponds to the angle of the groove flank 43. In the groove 37, as is shown in FIG. 6, the pin 1 is then guided by engagement of the sleeve 19 with the groove wall 49 at the left-hand inner side and by engagement of the groove flank 43 with the conical surface of the point 13 at the other side. FIG. 2a shows the pin 1 located in the groove 37, the pin, as is shown in FIG. 6, being guided between the wall 49 and the groove flank 43.

In FIG. 3a the command disc 2 has advanced still further in angular rotation, and the pin has run out of the groove 37 into an eccentric diversion 51 extending outwardly from the axis 11 in the direction of rotation 33. The groove wall 53, which is located at the right in FIG. 6, does not follow the bend of the bottom groove 41 and the oblique flank 43 into the diversion. The pin 1 however follows the bottom groove 41 into the diversion, because it is constrained from tangential motion by the connection to the lever 3, and is pulled inwards in the direction of the disc center by the flank 43.

From the bottom surface 17 of the command disc 2 wide arcuate ridges 55 and 57 project, which ridges form walls of three pin-catching grooves 59, 61, 63. The bottoms of the grooves 59, 61 and 63 have a raised bottom surface 17' at the parts which adjoin the flank 43 of the bottom groove 41 and diversion 51. The bottom surfaces 17' slope downward against the direction of rotation of the command disc 2 down to the level of the surface 17 in the portions of the grooves 59, 61 and 63 shortly before the line 7. The concentric grooves 59, 61 and 63, if the pin assembly 1 has engaged one of them, guide the pick-up arm or the stylus into specific positions. If the pin 1 has engaged the groove 59, the apparatus is switched off. If the pin 1 has engaged the groove 61, the stylus is positioned on the edge of a 12 inch record. If the pin 1 has engaged the groove 63, the stylus is positioned on the edge of a 7 inch record.

Figures 4A, 4B:
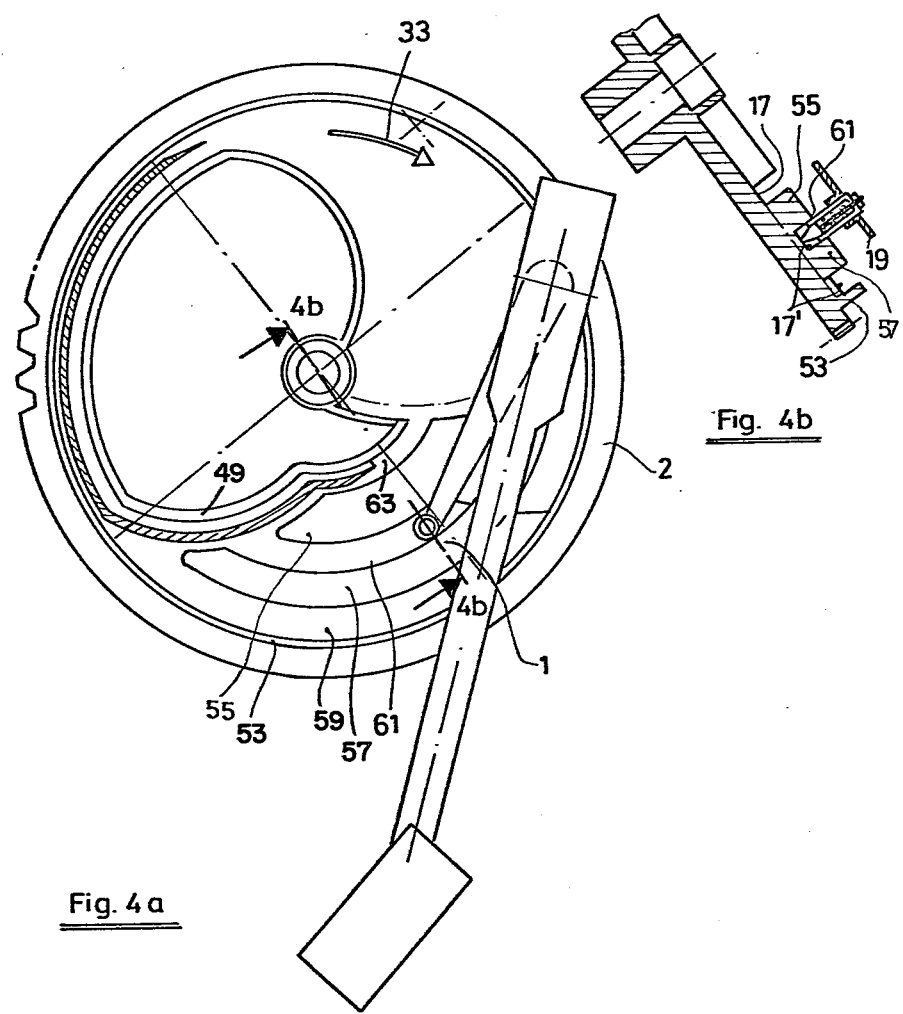

In FIG. 3a the pin 1 is located before the entrance of the groove 61. Now it is assumed that the pin 1 should engage this groove. In order to achieve this, the inward motion of the pin is blocked by interposing a stop 67 which, for example, is moved into place by a selection means 69 shown schematically. The pin then slips out of the bottom groove 41 of the diversion 51, over the flank 43 onto the raised bottom level 17' at the beginning of the groove 61 (FIG. 3b). As the command disc 2 is rotated further, the pin 1 runs in the groove 61, and is guided by its sleeve 19 between the groove walls 55 and 57 (FIGS. 4a and 4b). The level of the bottom surface 17' of the grooves 59, 61 then drops gradually as the area of the line 7 is approached so that engagement with the raised bottom 17' is gradually discontinued as the pick-up engages a record.

Figures 5A, 5B:
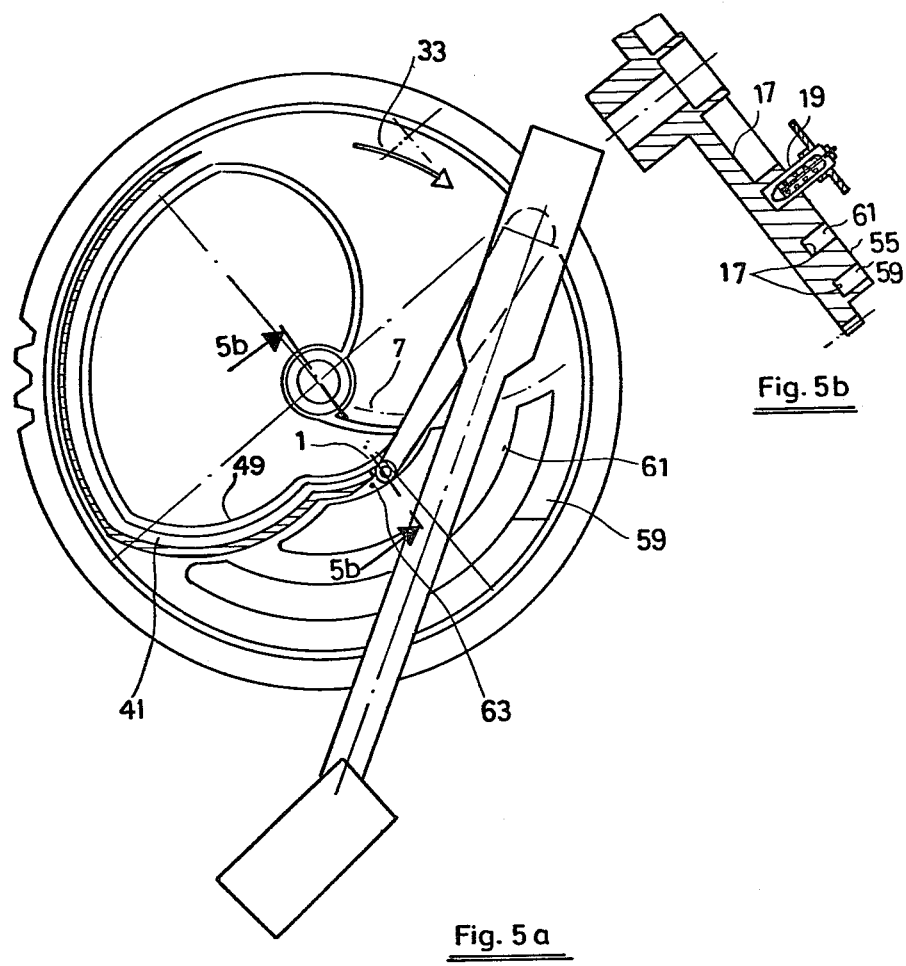

FIGS. 5a and 5b show that the pin 1, as it has not been forced out of the bottom groove 41 in the diversion 51 by interposition of a stop, has automatically engaged the groove 63 for playing a 7 inch record. As soon as the pin 1 has left the grooves 59, 61 or 63, the command disc 2 stops, so that the pin is again freely movable along the dash-dot line 7 as in FIG. 1.

What is claimed is:

1. A pick-up arm control mechanism for an automatic record player in which pick-up arm movements during the changing cycle are controlled by a command disc in which grooves are formed for a sensor pin connected to the pick-up arm, one of a plurality of substantially concentric grooves being the pin guiding groove for a specific phonograph record size, and the pin being directed into the desired pin-guiding groove by mechanical means, the mechanism comprising a sensor pin having a sleeve, and a bottom groove engaging portion tapered toward a bottom point and means for resiliently mounting at least said bottom groove engaging portion, means for connecting the sensor pin to a pick-up arm to control lateral pivoting of the arm, a command disc mounted for rotation about a disc axis, said disc having a surface generally perpendicular to said axis and having a plurality of grooves formed therein, including an eccentric diversion groove having a bottom groove portion having a trapezoidal cross-section with a perpendicular inner flank and an oblique outer flank inclined at an angle corresponding to the taper of the pin bottom point, extending outwardly from said axis along said surface in a given rotational direction, a plurality of generally concentric pin-guiding grooves each having an entrance adjoining the diversion groove, means for rotating said disc in said given direction, said pin being mounted in said connecting means such that said pin engages said diversion groove as the disc rotates in said given direction during a changing cycle, said sleeve engages the perpendicular inner flank, and said bottom groove engaging portion resiliently engages said oblique outer portion of the bottom groove portion; whereby engagement of the pin with the diversion groove during said rotation urges said pin toward the axis of the disc, a stop, and means for selectively interposing said stop in a position adjacent the entrance of a selected pin-guiding groove so as to block further movement of the pin toward the axis, whereby upon engagement of the pin with the stop while disc rotation is urging the pin toward the axis, the pin is forced out of resilient engagement with said diversion groove and engages said selected pin-guiding groove.

2. A mechanism as claimed in claim 1 wherein said pin sleeve is cylindrical, and the pin includes a head member mounted for axial movement within said sleeve, a bottom portion of said head forming said bottom groove engaging portion; said means for mounting said bottom groove engaging portion comprises means for resiliently urging said head outward of said sleeve toward the command disc; said means for mounting the pin positions the sleeve generally parallel to said command disc axis; and said pin-guiding grooves are defined by cylindrical groove walls formed in said surface concentric with said disc axis, entrance ends of said groove walls being spaced from said bottom groove portion of the diversion groove.

3. A mechanism as claimed in claim 2 wherein said command disc surface has a bottom region arranged such that, when said command disc is in a position corresponding to a path along which said pin moves during record playing, said bottom region is spaced below the bottom point of the pin; said pin-guiding grooves have a bottom raised above said bottom region along a length of said pin guiding grooves extending from the groove entrances, said pin being so positioned by said means for mounting that the bottom point of the pin engages said raised bottom when the pin is engaging that length of the pin-guiding groove, and said sleeve is guided for relative radial movement by said groove walls.

* * * * *